March 12, 1929. G. R. BOTT 1,705,281
SHEET METAL INCASED BEARING
Filed May 24, 1926
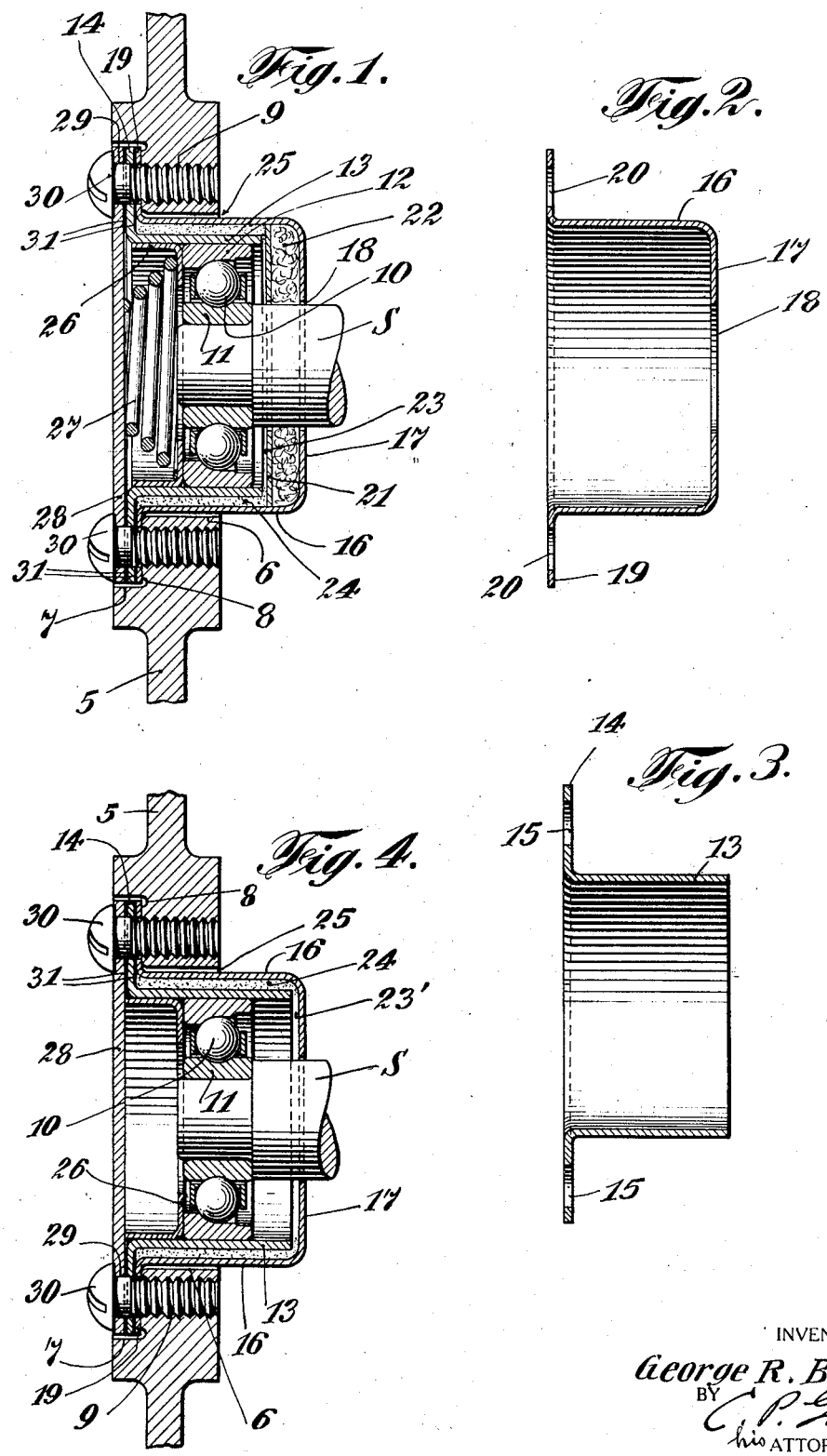
INVENTOR
George R. Bott
BY
his ATTORNEY Patented Mar. 12, 1929.

1,705,281

UNITED STATES PATENT OFFICE.

GEORGE R. BOTT, OF MOUNT VERNON, NEW YORK, ASSIGNOR TO NORMA-HOFFMANN BEARINGS CORPORATION, OF STAMFORD, CONNECTICUT, A CORPORATION OF NEW YORK.

SHEET-METAL-INCASED BEARING.

Application filed May 24, 1926. Serial No. 111,168.

This invention relates to sheet metal incased bearings of the type shown and described in Patent No. 1,444,751, granted to The Norma Company of America, on February 6, 1923, as assignee of Frederick E. Mueller.

It is the primary object and purpose of the present improvements to render the bearing practically noiseless in its operation, and at the same time simplify the design and construction of the several parts so that their fabrication may be easily accomplished and quantity production increased with a corresponding decrease in manufacturing cost.

It is a more particular object of my invention to provide a structure wherein resonant effects induced in the wall of the bearing containing cup or casing by vibration will be overcome, secondly, to provide a means interposed between the casing or cup wall and the bearing for the purpose of absorbing such vibrations, and thirdly, to provide as a vibration absorbing medium, a reserve lubricant supply in the form of an annular body of grease which is subject to frictional heat generated in the bearing when the latter becomes deficient in lubricant so that the grease is reduced to the melting point and thereby caused to flow into and upon the parts of the bearing.

With the above and other objects in view, the invention consists in the improved sheet metal incased bearing and in the form, construction and relative arrangement of its several parts as will be hereinafter more fully described, illustrated in the accompanying drawings, and subsequently incorporated in the subjoined claims.

In the drawings, wherein I have shown several simple and practical embodiments of the invention, and in which similar reference characters designate corresponding parts throughout the several views,—

Figure 1 is a sectional view through a part of a housing or casing wall showing my improved sheet metal incased shaft bearing mounted therein;

Fig. 2 is a detail sectional view of the outer sheet metal cup within which the several parts are adapted to be enclosed;

Fig. 3 is a similar detail sectional view of the inner flanged sleeve or cylinder which directly receives the bearing, and Fig. 4 is a view similar to Fig. 1, illustrating a slightly modified form of the invention.

Referring in detail to the drawings, 5 designates the support, such as the wall of a motor housing or casing upon which the sheet metal incased bearing is adapted to be mounted. This wall is provided with an opening 6 therethrough, and in the outer face of the wall surrounding said opening the annular recess 7 is formed. The base wall of this recess at the outer side thereof is preferably provided with an annular groove or channel 8 therein. Inwardly of said groove, and at suitably spaced points around the opening 6, the wall 5 is provided with the tapped or threaded openings 9 to receive attaching screws hereafter referred to.

The shaft end shown at S is supported in a radial type bearing generally indicated at 10 which may be of any approved construction, the inner race ring 11 of said bearing having a light press fit on the end of the shaft. The outer bearing ring 12 has a snug frictional fit within a sheet metal cylinder or sleeve 13. This cylinder is preferably formed from sheet steel and is open at its opposite ends, one end thereof being formed with the outwardly directed annular flange 14 having screw receiving openings 15 therein. This sleeve or cylinder is adapted to be enclosed within a thin walled cup 16, preferably formed from soft sheet copper. The bottom or end wall 17 of said cup is provided with the shaft receiving opening 18 while the cylindrical wall of the cup at its opposite end is formed with the outwardly extending annular flange 19 having the screw receiving openings 20. Within said cup and in spaced relation to its end wall 17, the annular disc 21 is arranged and between said disc and the end wall of the cup an absorbent washer of felt or other material 22 is arranged. This felt material serves as a carrier for a suitable lubricant and also closely engages upon the periphery of the shaft S to close the openings in the end wall of the cup and the plate 21. When the parts thus far described are assembled, it is to be noted that the inner end of the cylinder or sleeve 13 is slightly spaced from the disc or plate 21 as shown at 23.

The cylinder 13 is of appreciably less diameter than the cup 16, and in the space between the walls of said cylinder and cup an annular body of grease 24 of heavy consistency is packed. The composition of this grease is so predetermined that it will melt at a desired temperature and flow freely as a fluid from the space between said cylinder and cup walls into the cylinder and upon the parts of the bearing 10.

It will be observed that, when the cup 16 with the enclosed parts is inserted through the opening 6 in the supporting wall, the wall of said cup is spaced from the wall of said opening as at 25 in the same manner as in the issued patent above identified so that sufficient clearance is provided to take care of vibratory movement of the cup without metallic contact between the cup wall and the wall of said opening. However, since I propose to form said cup from a substantially inert material, such as soft copper, said cup wall will also be non-resonant whereby any noise from this source will be obviated.

Within the outer end of the cylinder 13 and against the bearing the follower plate 26 is inserted. As herein shown, this follower is in the form of a shallow sheet metal cup, the marginal wall of which has a snug sliding fit with the inner surface of the cylinder 13. This follower is urged yieldingly against the bearing by means of a helical spring 27, the larger end coil of which bears against the follower while the outer or smaller end coil bears against the inner side of a face plate 28 which is adapted to be arranged over the outer open end of the cylinder 13, said plate having a diameter preferably equal to the diameters of the flanges 14 and 19 on said cylinder and the cup 16 respectively. This face plate is of course, likewise provided with openings 29 to register with the openings 15 and 20 in the flanges 14 and 19 for the purpose of receiving the attaching screws 30 which are threaded into the tapped openings 9 of the supporting wall.

If desired, I may arrange between the face plate and the flange 14 and also between said flange and the flange 19 of the cup 16, thin annular sheets of paper indicated at 31 as a further assurance against the production of noise in the operation of the bearing.

In Fig. 4 of the drawings, I show a slightly modified form wherein the spring 27 is omitted and also the annular disc or plate 21 and the felt packing material 22. In this case, an outer cup 16 of less depth may be employed, and the inner end of the bearing receiving cylinder 13 is spaced from the end wall of said cup as indicated at 23'. Otherwise, this modified construction substantially corresponds in all respects with that above described.

From the foregoing description, it will be obvious that such a sheet metal incased bearing will be practically noiseless in its operation. When the parts are initially assembled, the space within the cylinder 13 surrounding the bearing is packed with a suitable lubricant. However, after long continued operation, this lubricant may evaporate to a certain extent and become deficient in its lubricating qualities so that considerable frictional heat will be generated in the rotation of the bearing. This heat in the operation of the bearing will be transmitted through the wall of the cylinder 13 and through the space 23 to the annular body of heavier grease contained between the cylinder wall and the wall of the cup 16. As the temperature increases, the grease is reduced to the melting point so that it is caused to flow around the inner end of the cylinder 13 through the space 23 into said cylinder and upon the parts of the bearing. This reserve supply of lubricant thus insures the prolonged operation of the bearing in a satisfactory manner, and in addition, constitutes a cushioning and absorbing medium which, to a large extent, absorbs vibrations of the shaft and bearing, and thereby reduces to a minimum the amplitude of vibration of the outer cup 16.

It will further be appreciated that I attain the several objects of my present improvements in a structure consisting of relatively few parts of simple form which can be easily fabricated, thus enabling such sheet metal encased bearings to be manufactured on a quantity production basis and at relatively small cost. I have herein disclosed several practical examples of my present improvements, but it will of course, be understood that the invention is not necessarily limited to the specific type of radial bearing shown in the accompanying drawings, nor to the particular form and relative proportions of the several other elements above described. In other words, the essential features of my present disclosure are susceptible of embodiment in various other alternative structures, and I accordingly reserve the privilege of resorting to all such legitimate changes in the several parts thereof as may be fairly incorporated in the spirit and scope of the invention as claimed.

I claim:

1. In combination with a shaft bearing, an enclosing casing for said bearing adapted to be mounted at one of its ends in fixed relation to a wall structure and in non-load sustaining relation to the bearing and formed from substantially inert non-resonant sheet material.

2. In combination with a shaft bearing a load sustaining member directly supporting the bearing, and an enclosing casing for said bearing and member having means at one of its ends for attachment to a supporting structure and formed from a drawn sheet of substantially inert non-resonant material.

3. In combination with a shaft bearing, a cup encasing said bearing in non-load sustaining relation thereto adapted to be secured at one of its ends in fixed relation to a supporting structure and formed of drawn sheet copper.

4. In combination with a shaft bearing, a cup-like casing enclosing said bearing in non-load sustaining relation thereto and consisting of a thin-walled cylinder of substantially inert non-resonant sheet material having means at one of its ends for attachment to a supporting structure.

5. In combination with a shaft bearing, a cup-like casing enclosing said bearing in non-load sustaining relation thereto and consisting of a thin-walled cylinder of substantially inert non-resonant sheet copper having means at one of its ends for attachment to a supporting structure.

6. In combination, an open-ended sheet metal cylinder, a shaft bearing fitted therein, a cup of substantially inert non-resonant sheet material enclosing said cylinder and bearing, and means for securing said cylinder and cup at one of their ends in fixed relation to each other.

7. In combination, an open-ended sheet metal cylinder, a shaft bearing fitted therein, a cup of substantially inert non-resonant sheet material enclosing said cylinder and bearing, and means for detachably securing said cylinder and cup at their corresponding ends in fixed relation to a supporting structure.

8. In combination, a cylindrical sheet metal shaft bearing receiving member, a cup shaped casing enclosing said member formed from substantially inert non-resonant sheet material, and said member and the casing having means at one of their ends for securing the same in fixed relation to each other upon a supporting structure.

9. In combination, a cylindrical sheet metal shaft bearing receiving member, a cup shaped casing enclosing said member formed from substantially inert non-resonant sheet material, the cylindrical walls of said member and the casing being spaced apart, means arranged in the space between said walls for absorbing vibration in the bearing, and said member and the casing having means at one of their ends for securing the same in fixed relation to each other upon a supporting structure.

10. In combination, a cylindrical sheet metal shaft bearing receiving member, a cup shaped casing enclosing said member formed from substantially inert non-resonant sheet material, lubricant supply means for the bearing arranged in the space between said walls, and said member and the casing having means at one of their ends adapted to be secured in fixed relation to a supporting structure.

11. In combination, a cylindrical sheet metal shaft bearing receiving member, a cup shaped casing enclosing said member formed from substantially inert non-resonant sheet material, an annular body of grease packed in the space between said walls for supplying lubricant to the bearing and said body also constituting means for absorbing vibration in the bearing, and said member and the casing having means at one of their ends adapted to be secured in fixed relation to a supporting structure.

12. In combination with a radial shaft bearing, a wall surrounding said bearing adapted to be fixed at one of its ends to a supporting structure, load sustaining means supporting the bearing independently of said wall, and an annularly continuous vibration absorbing medium interposed between said wall and the loading sustaining means.

13. In combination with a radial shaft bearing, a cylindrical member open at its opposite ends within which said bearing is fitted, an outer cup shaped casing enclosing said bearing and member and concentrically spaced from the wall of the latter, means for securing said member at one of its ends in fixed relation to the casing, and said space between the walls of said member and the casing adapted to contain a reserve lubricant supply supported by said member normally out of contact with the bearing but subject to heat frictionally generated in the bearing and thereby caused to flow from said space into the other end of said cylindrical member and upon the parts of the bearing.

14. In combination, a tubular shaft bearing receiving member, a casing enclosing said member and having a wall spaced from the wall of said member, said space communicating with the interior of said tubular member and adapted to receive a suitable lubricant supported by said member normally out of contact with the bearing to be reduced to a fluid condition by frictional heat generated in the operation of the bearing.

15. In combination, a tubular shaft bearing receiving member, a casing enclosing said member and having a wall spaced from the wall of said member, said space communicating with the interior of said tubular member and adapted to receive a suitable lubricant supported by said member normally out of contact with the bearing to be reduced to a fluid condition by frictional heat generated in the operation of the bearing, and a common means for fixedly mounting said member and casing upon a supporting structure.

16. In combination, a tubular shaft bearing receiving member, a casing enclosing said member and having a wall spaced from the wall of said member, said space communicating with the interior of said tubular member and adapted to receive a suitable lubricant supported by said member normally out of contact with the bearing to be reduced to a fluid condition by frictional heat generated in the operation of the bearing, and said member and casing having means on their corresponding ends adapted to be detachably secured by a common fastening means upon a suitable support.

17. In combination, a tubular shaft bearing receiving member, a casing enclosing said member and having a wall spaced from the wall of said member, said casing and member being provided on their corresponding ends with outwardly projecting flanges, vibration absorbing means in the space between the walls of said member and casing, and a common means for fixedly securing said flanges to a suitable support.

18. In combination, a tubular shaft bearing receiving member, a casing enclosing said member and having a wall spaced from the wall of said member, said casing and member being provided on their corresponding ends with outwardly projecting flanges, said tubular member being open at its opposite end and communicating with the space between the walls of said member and casing, a lubricant of heavy consistency confined in said space constituting a vibration absorbing medium and adapted to be reduced to a fluid condition by frictional heat generated in the operation of the bearing, and a common means for fixedly securing said flanges to a suitable support.

19. In combination, a tubular shaft bearing receiving member open at its opposite ends and having an outwardly projecting flange on one end thereof, a cup-like casing enclosing said member having a wall spaced from the wall of said member, said casing wall having an outwardly projecting flange on one end and the interior of the tubular member communicating with the space between said walls, a lubricant body of heavy consistency confined between said spaced walls adapted to be reduced to a fluid condition by frictional heat generated in the operation of the bearing, said lubricant also constituting a vibration absorbing medium, a face plate adapted to close the outer end of said tubular member, and a common means for detachably securing said face plate and the flanges of said member and casing to a suitable support.

20. In a bearing structure, a bearing, a housing supporting and substantially enclosing the bearing, an annular chamber of substantial radial dimension intermediate the bearing and housing, and in said chamber a substantially plastic, normally non-fluid lubricant of non-resonant character, normally acting as a sound-deadener and constituted to be reduced to fluid consistency by heat generated by the bearing and then acting to lubricate the same.

In testimony that I claim the foregoing as my invention, I have signed my name hereto.

GEORGE R. BOTT.